INVENTOR.
MILES A. SHADLEY III
BY
Olsen and Stephenson
ATTORNEYS

INVENTOR
MILES A. SHADLEY III
BY
Olsen and Stephenson
ATTORNEYS

United States Patent Office 3,447,864
Patented June 3, 1969

3,447,864

AUTOMATICALLY SYNCHRONIZED VISUAL AND SOUND PRESENTATION SYSTEM

Miles A. Shadley III, 15964 Dundee Blvd., Dundee, Mich. 48131

Filed Oct. 18, 1965, Ser. No. 497,258
Int. Cl. G03b *31/06*
U.S. Cl. 352—17 12 Claims

ABSTRACT OF THE DISCLOSURE

A dual channel tape recorder is used to record sound narration on one channel of a tape while control signals are recorded on a second channel. The control signals are produced by a hand-held signal generator which is plugged into a phone jack on the recorder. A switch is provided such that the signals may be selectively applied either to a slide projector or to the stop-frame mechanism of a motion picture projector. The signals from the signal generator may be used to control the selected projector simultaneously with their recording on the tape.

This invention relates generally to combined visual and sound presentation systems and more particularly to a control for a sound unit, a movie projector and a slide projector in such systems.

An effective presentation can be made when a prerecorded narrative is used in conjunction with slides. A visual presentation is arranged on a series of slides and the accompanying narrative is recorded on a tape recording and playback machine. By using a two channel tape recording and playback machine and suitable controls the sound can be recorded on one channel and programmed control signals can be recorded on the other channel to operate the slide projector automatically during playback of the recorded sound. Use of an endless recording tape is desirable so that at the completion of a presentation the system is ready for the next presentation. In accordance with one important aspect of the present invention it has been found desirable to also incorporate a movie projector with the same tape recording and playback machine and to provide a single automatic control that can be manufactured economically and used with one tape recorder and selectively with either a slide projector or a movie projector. For effective movie presentation it is desirable to provide an automatic freeze frame capability in the control so that a still frame can be projected while the sound continues. It is also desirable that the system have a programming capability such that an operator can record control signals on the tape while simultaneously providing control signals to the projector in a simple and effective manner without increasing the cost of the system substantially.

Therefore, the objects of the present invention are to provide a low cost system for adding sound to slide and movie presentations.

Another object of the present invention is to provide a sound unit and a projector control for automatically operating the projector.

A further object of the present invention is to provide a sound unit and a movie projector control having the capability to automatically interrupt and hold the movie presentation during continued sound presentation.

Still further objects of the present invention are to provide a hand held pulse generator used in conjunction with the control and which is manually operated to simultaneously program control pulses and operate either a slide projector or a movie projector.

Other features, objects and advantages of the present invention will become apparent in connection with the following description, the appended claims and the accompanying drawings in which:

Figures 5, 6A, 6B, 7:
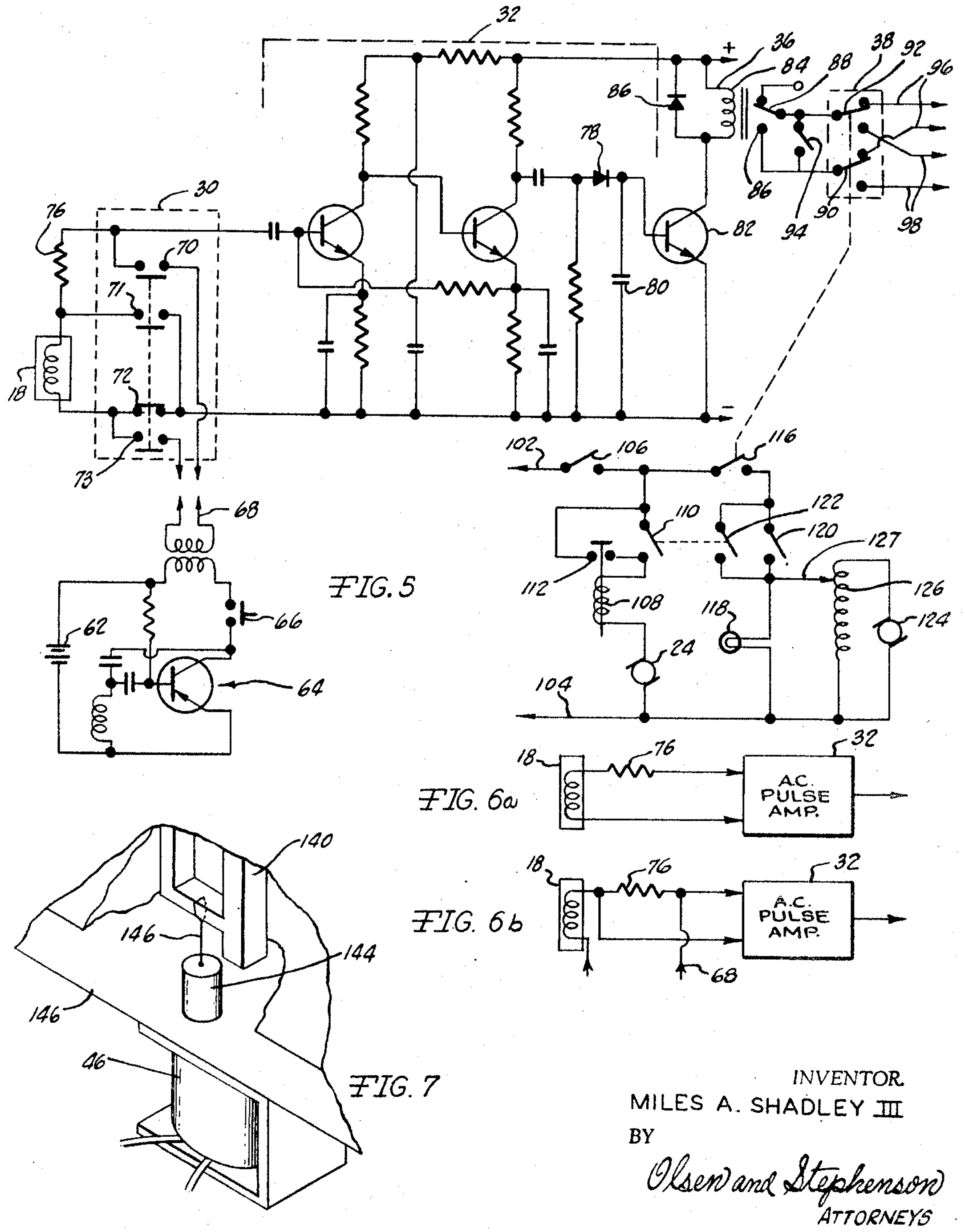
FIGURE 5 is a partial circuit diagram of the control illustrated in FIG. 2.

FIGURES 6*a* and 6*b* illustrate connections between a control channel tapehead, the pulse generator and a pulse amplifier in the control circuit during playback and recording, respectively; and FIGURE 7 is a fragmentary perspective view of a freeze frame mechanism in the movie projector which is modified in accordance with the present invention for automatic operation.

Figure 1:
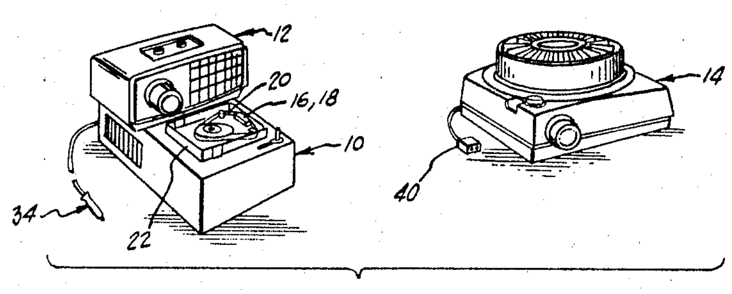
FIGURE 1 is a perspective view of a slide projector, a movie projector and a tape recording and playback machine which also houses the controls for automatic tape operation of either the movie projector or the slide projector.
Figures 2, 3:
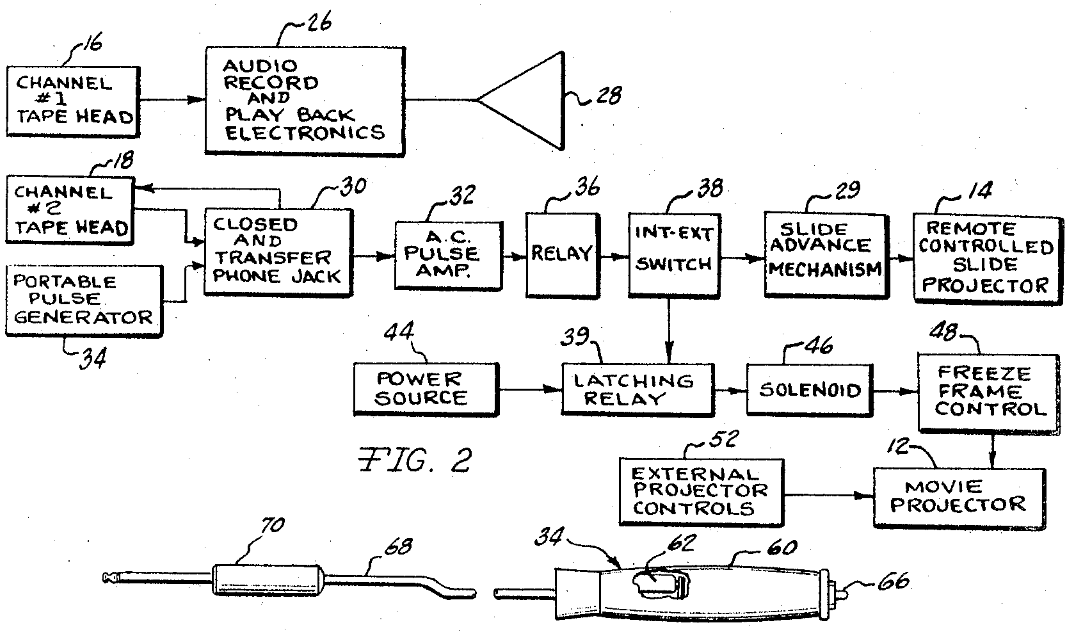
FIGURE 2 is a block circuit diagram of the control including some of the components of the recorder, the movie projector and the slide projector.
FIGURE 3 is a view of a hand held pulse generator for the control illustrated in FIG. 2 by which an operator can selectively program control signals and simultaneously operate either the slide or the movie projector while the control program is being recorded.

Referring to FIG. 1, an automatic sound and visual presentation system of the present invention generally comprises a tape recording and playback machine 10 which also houses the controls illustrated in FIG. 2. A movie projector 12 is mounted directly on the machine 10 for internal connection with the control. A slide projector 14, although illustrated separately and detached from the machine 10, is a part of the combined presentation system and is adapted for automatic operation by the machine 10. The tape recording and playback machine 10, the movie projector 12 and the slide projector 14 are, per se, commercially available units with only slight modifications and therefore will be described in detail only to the extent necessary to disclose the presentation system and the controls of the present invention. The tape recording and playback machine 10 is a two channel system and includes a channel one tapehead 16 and a channel two tapehead 18. In the preferred embodiment the machine 10 uses an endless magnetic recording tape 20 loaded in a cartridge 22 which is removable from the machine 10. The tape is fed past the heads 16, 18 by conventional drive mechanisms including a motor 24 (FIG. 5). The machine 10 includes the usual audio record and playback electronics 26 and speaker 28 operatively coupled to the tapehead 16 to record and reproduce sound on channel one of tape 20. In the preferred embodiment the machine 10 is provided with a shutoff which operates automatically at the end of a sound recording on tape 20. Also in the preferred embodiment the movie projector 12 uses an endless film strip loaded in a magazine and the projector 12 is provided with a shutoff which operates automatically at the end of the picture sequence on the film. The projector 12 also includes a manual freeze frame mechanism to project a still picture. The freeze frame mechanism is modified in accordance with the present invention for automatic operation by the control programmed on channel two of tape 20 as will later be described. One movie projector that can be used with the present invention is sold commercially by the Technicolor Corp., Hollywood, and is identified as a "Technicolor 800 Instant Movie Projector." The slide projector 14 has a conventional slide advance mechanism 29 which normally is controlled remotely by means of a manually operated switch that is modified in the present invention as will later be described.

Referring to FIG. 2 the channel two tapehead 18 is connected to a phone jack 30 and during playback from channel two jack 30 transfers the control program from the tapehead 18 to a pulse amplifier 32. A portable pulse generator 34, separate and detachable from machine 10, is arranged to be connected in the phone jack 30 with jack 30 being operable to transfer pulse signals from the generator 34 to the tapehead 18 and also to the pulse amplifier 32 when a control program is being recorded on tape 20. The amplified pulse signals developed by amplifier 32 energize a relay 36 having contacts that are selectively connected by an internal-external switch 38 either in the slide advance mechanism 29 of slide projector 14 or in the energizing circuit of a latching relay 39. When relay 36 is connected to slide advance mechanism 29 of the projector 14 by switch 38, the relay contacts duplicate the switch function of the manually operated switch on a conventional remote control slide projector. Numerous commercially available slide projectors include a slide advance mechanism operated by a remote switch and are usable with the present invention by eliminating the remote switch and providing suitable adapter leads 40 (FIG. 1) for operation by relay 36. The latching relay 39 is connected between a power source 44 and a solenoid 46 to energize the solenoid 46 on alternate closings of the relay 36. Solenoid 46 is in turn coupled mechanically to a freeze frame control 48 of the movie projector 12. Commercially available projectors include a freeze frame control such as a clutch in the drive mechanism which is disengaged by manual operation. In accordance with one aspect of the present invention, the freeze frame control is arranged to be operated automatically by the solenoid 46. Projector 12 is also under the control of external projector controls 52 to be described hereinafter.

In general channel one of tape 20 is recorded with sound in a conventional manner and then the control program is recorded on channel two while the sound is played back and the projectors 12 and 14 are operating, although it is to be understood that the sound and control program may be recorded simultaneously. To record the control program, the portable pulse generator 34 is connected in the phone jack 30. When the narration on channel one reaches a point at which the visual presentation should be changed, the operator merely actuates the pulse generator 34. With a slide presentation, generator 34 will be actuated when the next slide is to be shown and with the movie presentation generator 34 will be actuated when a frame is to be presented as a still picture for detailed narration. When the generator 34 is energized, a pulse is transferred through jack 30 to the tapehead 18 for recording on channel two of tape 20 and simultaneously the pulse is transferred to amplifier 32 to operate relay 36. With a slide presentation and with switch 38 in the corresponding position, operation of relay 36 will actuate the slide advance mechanism 29 in projector 14. With a movie presentation and with switch 38 in the corresponding position, operation of relay 36 will actuate the latching relay 39 which in turn energizes solenoid 46. Solenoid 46 in turn operates the freeze frame control 48 to interrupt operation of projector 12 and project a still picture. To restart the movie presentation the operator again energizes the pulse generator 34 and the second pulse is simultaneously recorded on tape 20 and applied to the latching relay 39. The second actuation of relay 39 disconnects solenoid 46 from the source 44 and releases the freeze frame control 48.

As illustrated in FIGS. 3 and 5, the portable pulse generator 34 generally comprises a hollow case 60 which houses a battery 62 and a transistorized oscillator 64 (FIG. 5). Oscillator 64 is a conventional oscillator such as the phase shift oscillator illustrated in FIG. 5 and in the preferred embodiment generates a three kilocycles per second signal. The oscillator includes a push button switch 66 for connecting battery 62 in the oscillator 64 to energize the oscillator. The oscillator output is arranged to be coupled into the jack 30 through leads 68 and a jack plug 70. The phone jack 30 has four sets of contacts 70, 71, 72, 73 illustrated schematically in FIG. 5. With the plug 70 withdrawn from jack 30 during playback, contacts 72 are normally closed and contacts 70, 71, 73 are normally open to connect the tapehead 18 and a series resistor 76 directly across the input to amplifier 32 as illustrated in FIG. 6*a*. When the plug 70 is inserted in the jack 30 for recording, the plug closes contacts 70, 71, 73 and opens contacts 72 to connect the pulse output from oscillator 64 (leads 68) across the series combination of resistor 76 and tapehead 18 through contacts 70, 73 and simultaneously connect the input of amplifier 32 across resistor 76 through contacts 71 as illustrated in FIG. 6*b*. Thus during playback control pulses recorded on channel two of tape 20 are coupled directly from tapehead 18 to the pulse amplifier 32 through resistor 76. However during recording the control pulses from oscillator 64 are applied across resistor 76 and tapehead 18 for recording on channel two of tape 20 and a portion of the pulse developed across resistor 76 is applied to the pulse amplifier 32 to operate either projector 12 or projector 14 depending on the position of switch 38. Resistor 76 is small relative to the impedance of tapehead 18 at the control signal frequency so that the voltage dividing function of resistor 76 and tapehead 18 during recording provides a low level signal across resistor 76 in the millivolt range for amplifier 32.

Amplifier 32 is a conventional alternating current amplifier which develops an amplified pulse that is applied through rectifier 78 and an integrating capacitor 80 to the emitter-base input of an output transistor 82. The time constant of capacitor 80 and the bias on transistor 82 are chosen so that a short but predetermined minimum pulse is required to forward bias transistor 82 and thus minimize spurious operation of relay 36. Connected in the collector-emitter circuit of amplifier 32 is an actuating coil 84 of relay 36. A rectifier 86 is connected across coil 84 to improve the response of relay 36. Relay 36 also has a fixed contact 86 and a movable contact 88 which are connected respectively to switch arms 90, 92 of switch 38. Also connected across contacts 86, 88 is a normally open switch 94 which can be operated manually to override the control by contacts 86, 88. Switch 38 is a double-throw switch which in one position (external) illustrated in full lines in FIG. 5 connects the contacts 86, 88 to leads 96 and in the other position (internal) connects the contacts to leads 98. Leads 96 are arranged to be connected to the adapter leads 40 of the remote controlled projector 14 through a plug 100 on a control panel 101 (FIG 4) located at the back of machine 10. When contacts 86, 88 close the slide advance mechanism 29 in projector 14 is actuated. The leads 98 are connected in the latching relay 39 to operate relay 39 when the contacts 86, 88 close and switch 38 is in the internal position.

The control of the present invention also includes modification in the drive circuit of the tape recording and playback machine 10 and the movie projector 12. A power supply circuit for the machine 10 and the projector 12 illustrated in FIG. 5 includes a pair of supply conductors 102, 104 with a main on-off switch 106 connected in conductor 102. The drive motor 24 for machine 10 is connected across conductors 102, 104 through a relay coil 108 and a start switch 110. The relay 108 has a pair of normally open contacts 112 which seal when switch 110 is closed momentarily to maintain motor 24 energized. The switch 38 has a third switch arm 116 connected in conductor 102 in a normally open position when arms 90, 92 are in the external position illustrated in full lines. When switch 38 is moved to its internal position to operate movie projector 12, arm 116 closes. A projector bulb 118 is arranged to be connected across conductors 102, 104 through switch 116, a switch 120 and a start switch 122. A drive motor 124 of the projector 12 is also arranged to be connected across conductors 102, 104 through switches 106, 116, 120, 122 and an auto-transformer 126. The auto-transformer 126 is variable by means of a wiper 127 and an adjusting knob 128 on panel 101 and serves as a variable speed control for motor 124 to synchronize the speed of motor 124 with the sound and control signals programmed on tape 20. Although precise synchronization is not essential, some control is desirable to compensate for speed variations in different tape recording and playback machines as well as speed variations in different movie projectors. The switch 122 is ganged to switch 110 so that the drive motors 24, 124 and the bulb 118 can be energized simultaneously. In the preferred embodiment the switch 120 is a microswitch operated automatically by a notch in the film strip of projector 12 in a conventional manner. The switch 120 is normally closed while the projector is running and is opened by the notch in the film to stop the projector 12 at the end of the film. When the projector is started at the beginning of the presentation by closing switch 122 initial movement of the film will close switch 120 to keep the projector 12 running.

Figure 4:
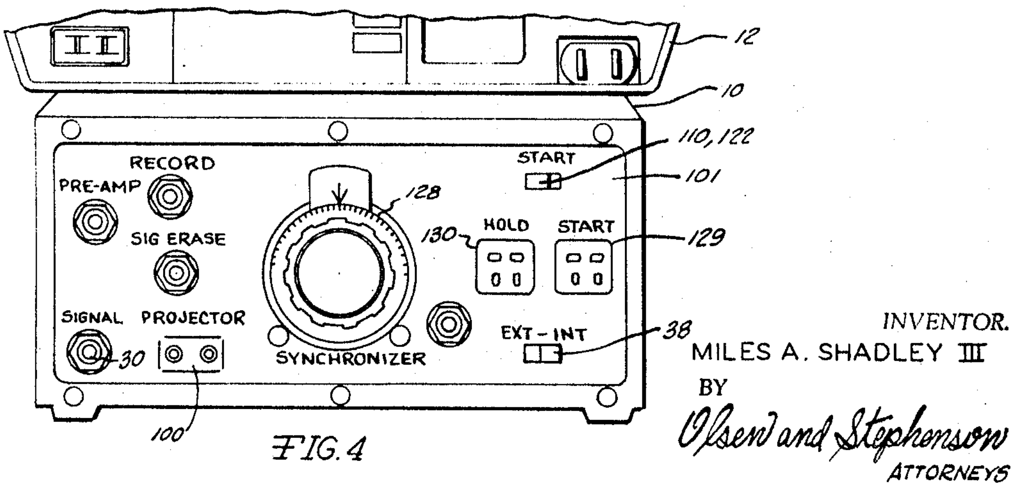
FIGURE 4 is a view of a control panel on the back of the tape recording and playback machine.

Referring to the operation of the control panel as illustrated in FIG. 4, with switch 38 in its internal position, the relay contacts 86, 88 are connected in the latch-relay 39 by conductors 98 and switch arms 90, 92 and the switch arm 116 is closed to ready the operation of motor 124. When the start switches 110, 122 (FIG. 5) are closed motor 24 in the tape recording and playback machine 10 and bulb 118 and motor 124 in the projector 12 are energized. The start switches 110, 122 may also be controlled remotely by means of a receptacle 129 and a remote switch (not shown). Preferably the switch 94 is also a remotely operated switch and is connected in the control through a "hold" receptacle 130. When the switch 38 is in the external position to operate projector 14, contacts 86, 88 are connected to the leads 96 which are connected to the slide advance mechanism 29 in projector 14 by the adapter leads 40. The control panel also includes a conventional arrangement for recording or erasing sound on channel one of the tape 20.

Although a particular construction of the freeze frame control 48 in projector 12 is not essential to present invention, as illustrated in FIG. 7 the control may include a manually operated plunger 140. Plunger 140 is spring biased to a normally raised position and when the plunger is depressed the drive mechanism in projector 12 is disengaged to protect a still picture. When plunger 140 is released it is spring returned to its raised position and the movie presentation continues. Solenoid 46 is fastened on a frame member 142 of projector 12 below plunger 140 and has an armature 144 which is connected to the lower end of plunger 140 by a flexible cable 146. A first pulse at relay 39 energizes solenoid 46 which pulls in armature 144 to lower plunger 140 and disengage the drive mechanism. Solenoid 46 remains energized until the next pulse at relay 39 at which time solenoid 46 is disconnected from source 44 to release plunger 140.

It will be understood that the combined visual and sound presentation system and the control for such a system that are disclosed and described herein are presented for purposes of illustration and are not intended to indicate limits of the invention, the scope of which is defined by the following claims.

What is claimed is:

1. A control system for use in combination with a sound playback machine and selectively with either a movie projector or a slide projector comprising freeze frame control means for interrupting operation of said movie projector to project a still picture in response to control signals, slide advance control means for operating said slide projector to automatically change slides in said projector in response to control signals, recording means for storing a program of said control signals to be played back by said playback machine, and first switch means for selectively applying control signals played back from said recording means to either said freeze frame control means or to said slide advance control means.

2. The control system set forth in claim 1 for use in combination with a tape recording and playback machine having a sound channel and a control channel and wherein said recording means comprises a two channel recording tape for storing audio signals on one of said channels and control signals on the other of said channels to program said control signals in time correlation with said audio signals.

3. The control system set forth in claim 2 wherein said tape recording and playback machine has tapehead means for recording and playing back control signals on said other channel and said control system further comprises circuit means arranged and adapted to connect said tapehead means to said switch means and a signal generator separate and detachable from said circuit means and arranged and adapted to be operatively coupled into said circuit means to serve as a source of said control signals for recording on said other channel and for application to said switch means.

4. The control system set forth in claim 3 wherein said circuit means comprises amplifier means having a pair of input terminals, said signal generator having a pair of output terminals, impedance means, and second switch means for selectively connecting said tapehead means and said impedance means in series across said input terminals of said amplifier means for playback from said other channel and for selectively connecting said tapehead means and said impedance means across said output terminals of said pulse generator for recording on said other channel and simultaneously connecting said impedance means across said input terminals of said pulse amplifier.

5. The control system set forth in claim 1 further comprising a portable hand held signal generator arranged and adapted to serve as a source of control signals and second switch means for selectively connecting and disconnecting said generator in said control to apply said control signals to said first switch means.

6. The control set forth in claim 5 wherein said signal generator comprises a case, a battery mounted in said case and a transistorized oscillator disposed in said case, third switch means on said case for connecting said oscillator to said battery to energize said oscillator and develop a control signal and means for selectively connecting said control signal in said control for recording said control signal on said recording means and simultaneous application to said first switch means for selective application to said freeze frame control means or slide advance control means.

7. In combination, a recording and playback machine for use with a two channel recording media, first transducer means for playback of a sound recording on one channel of said media and second transducer means for recording and playback of control signals on a second channel of said media, amplifier means, switch means having a playback position for said second channel transducer means and a record position, circuit means operative when said switch means is in said playback position to apply control signals from said second transducer means to said amplifier means, said amplifier means being responsive to control signals from said second transducer to provide a control output, a movie projector, freeze frame control means for interrupting operation of said projector to project a still frame, actuating means responsive to said control output to operate said freeze frame control means automatically, a signal generator which serves as a source of control signals, said circuit means being operative when said switch means is in said record position to apply control signals from said generator to said second channel transducer means and to said amplifier means, said amplifier means having a pair of input terminals, said signal generator having a pair of output terminals, impedance means in said circuit means and said switch means being operative in said playback position to connect said transducer means and said impedance means in series across said input terminals of said amplifier means and operative in said record position to connect said impedance means in series with said transducer means across said output terminals of said generator and simultaneously connect said impedance means across said input terminals of said amplifier means.

8. In combination, a recording and playback machine for use with a two channel recording media, first transducer means for playback of a sound recording on one channel of said media and second transducer means for recording and playback of control signals on a second channel of said media, amplifier means, switch means having a playback position for said second channel transducer means, circuit means operative when said switch means is in said playback position to apply control signals from said second transducer means to said amplifier means, said amplifier means being responsive to control signals from said second transducer to provide a control output, a movie projector, freeze frame control means for interrupting operation of said projector to project a still frame, actuating means responsive to said control output to operate said freeze frame control means automatically, said actuating means comprising a relay having a coil and a pair of contacts and being operative in response to a control output from said amplifier means to momentarily close said contacts, a latching relay, a power supply, and a solenoid, said latching relay being operatively connected to said relay contacts, said power supply and said solenoid to energize said solenoid from said power supply on alternate closing of said contacts.

9. The combination set forth in claim 8 wherein said actuating means further comprises second switch means having a first positon to operate said freeze frame control means in response to alternate closing of said contacts and a second position to couple said contacts to an external connection arranged and adapted to operate a remote controlled slide projector.

10. The combination set forth in claim 9 wherein said movie projector has a drive motor, a power source for driving said motor and circuit means connecting said motor to said power source comprising third switch means operable in a first position to connect said motor to said source, and means operatively connecting said second switch means to said third switch means for simultaneous actuation.

11. The combination set forth in claim 10 further comprising fourth switch means connected in parallel with said contacts, said forth switch means being manually operable to override control by said contacts.

12. In combination, transducer means for recording and playing back control signals from a recording media, a signal generator operative to serve as a source of control signals, amplifier means, and switch means having playback and record positions coupled to said transducer, said signal generator and said amplifier means and operative in said playback position to connect said transducer means to said amplifier to apply control signals from said media to said amplifier and operative in a record position to connect said generator to said transducer means and said amplifier means and apply control signals from said generator to said transducer means and to said amplifier means, said amplifier means having a pair of input terminals, said signal generator having a pair of output terminals, impedance means, and said switch means being operative to said playback position to connect said transducer means and said impedance means in series across said input terminals of said amplifier means and operative in said record position to connect said impedance means in series with said transducer means across said output terminals of said generator and simultaneously connect said impedance means across said input terminals of said amplifier means.

References Cited

UNITED STATES PATENTS

| | | | |
|---|---|---|---|
| 2,503,083 | 4/1950 | Waller | 88—28 |
| 2,975,672 | 3/1961 | Shields | 352—17 X |
| 3,168,743 | 2/1965 | Nesson | 352—191 X |
| 3,227,814 | 1/1966 | Ferris et al. | 179—100.2 |
| 3,309,163 | 3/1967 | White | 88—24 |

FOREIGN PATENTS

| | | |
|---|---|---|
| 1,094,587 | 12/1960 | Germany. |

NORTON ANSHER, *Primary Examiner.*

MONROE H. HAYES, *Assistant Examiner.*

U.S. Cl. X.R.

352—25, 169; 353—15